United States Patent Office 2,912,411
Patented Nov. 10, 1959

2,912,411

POLYVINYL CHLORIDE PLASTIC COMPOSITIONS CONTAINING AN ORGANOPHOSPHORUS AMIDE AS AN ULTRAVIOLET INHIBITOR

John W. Tamblyn and Harry W. Coover, Jr., Kingsport, Tenn., assignors to Eastman Kodak Company, Rochester N.Y., a corporation of New Jersey No Drawing. Application November 27, 1957
Serial No. 699,166

8 Claims. (Cl. 260—45.9)

This invention relates to polyvinyl chloride plastics, and more particularly to the stabilization of such plastics. Exposure of polyvinyl chloride to heat or light results in discoloration and a deterioration in physical properties. Both heat and light stabilizers are required for polyvinyl chloride, and frequently synergistic effects are noted. It is an object of this invention to provide vinyl chloride polymer and copolymer plastic compositions of superior stability to ultraviolet light.

We have discovered that phosphorus amides having the general formula $(R)_2R'P:O$, in which R is a radical selected from the group consisting of amino, di-lower-alkyl amino, and phenylamino, and R' is a radical selected from the group consisting of di-lower-alkyl amino, lower alkoxy, phenyl, and chloro-lower-alkyl, have excellent light stabilizing action on vinyl chloride polymers and copolymers. They impart long-lasting light stability to polyvinyl chloride when incorporated in concentrations ranging from 0.1% to 10%. Vinyl chloride copolymers with acrylonitrile, methacrylonitrile, vinylidene chloride, alkyl acrylates, alkyl methacrylates, alkyl maleates, alkyl fumarates, etc., may also be stabilized by these phosphorus amides.

These phosphorus amides may be mixed with the polyvinyl chloride or vinyl chloride copolymer by any of a variety of conventional methods, such as by mixing on rolls, or by dissolving both the polymer and the stabilizer in a solvent. If polyvinyl chloride containing one of the above-described phosphorus amides is processed at elevated temperatures without an added heat stabilizer, the samples are discolored. These samples are bleached, however, by short exposure to light, and remain colorless thereafter for long periods of exposure. Samples processed with a suitable heat stabilizer are colorless from the beginning, and remain colorless for long periods of exposure to light.

EXAMPLE 1

For accelerated testing, we prepared compositions by rolling 100 parts by weight of polyvinyl chloride (B. F. Goodrich Company's Geon 101) with 30 parts by weight of dioctyl phthalate as plasticizer and 4 parts by weight of the phosphorus amide. After thorough mixing, the compositions were rolled into thin plates of 0.075 inch thickness. Rectangular strips, 2½ x 1 inch, cut from these plates, were exposed in a modified Weather-Ometer until a discoloration was noted. Dibutyl tin dilaurate was used as a typical light stabilizer for comparison purposes, in the same proportions, in samples otherwise of the same composition. The Weather-Ometer used was a DL–TS Atlas Twin-Arc machine modified by the addition of twelve Westinghouse fluorescent sun lamps and operated at a black panel temperature of 150° F. A similar modification of the Weather-Ometer was described in detail in a paper by J. W. Tamblyn and G. M. Armstrong, entitled "A Modification of the Atlas Twin-Arc Weather-Ometer," in Analytical Chemistry, 25, 460–5 (1953).

The results of these tests are shown in Table I.

*Table I*

| Sample | Inhibitor | Hours' Exposure Before Discoloration Noted |
|---|---|---|
| 1 | None | 100 |
| 2 | $(C_4H_9)_2Sn(OOCC_{11}H_{23})_2$(dibutyl tin dilaurate) | 450 |
| 3 | $((CH_3)_2N)_2P(O)(OCH_3)$ (methyl bis-(dimethyl-amido)phosphate) | 800 |
| 4 | $((CH_3)_2N)_3P:O$ (tris-(dimethylamido) phosphate) | 800 |
| 5 | $C_6H_5P(O)(NH_2)_2$(phenyl phosphondiamide) | 450 |
| 6 | $C_6H_5P(O)(N(CH_3)_2)_2$ (N,N'-tetramethyl phenyl phosphondiamide) | 325 |
| 7 | $ClCH_2P(O)(N(CH_3)_2)_2$(N,N'-tetramethyl chloro-methyl phosphondiamide) | 325 |
| 8 | $Na_2CO_3$(sodium carbonate) | 300 |
| 9 | $C_6H_5P(O)(NHC_6H_5)_2$(N,N'-diphenyl phenyl phosphondiamide) | 225 |

Synergistic effects were noted when heat stabilizers were used in combination with these phosphorus amides. For example, a polyvinyl chloride composition containing 100 parts by weight of polyvinyl chloride, 30 parts by weight of dioctyl phthalate, 2 parts by weight of sodium carbonate and 2 parts by weight of tris-(dimethylamido) phosphate or N,N'-tetramethyl chloromethyl phosphondiamide did not begin to discolor until after 1500 hours exposure in the modified Weather-Ometer. Similar effects were observed when other phosphorus amides were used.

EXAMPLE 2

Compositions were roll compounded as in Example 1 and compression molded to sheets 0.075 inch thick. These were cut into 2½ x 1 inch rectangular pieces and exposed outdoors in Kingsport, Tennessee, on racks, mounted at an angle of 36° with the horizontal and facing south. After 4 months, the unstabilized sample was light brown in color and showed surface crazing. After 2 years, the sample stabilized with 4 parts of a good conventional stabilizer, dibutyltin dilaurate, showed whitish spots and had started to turn brown. After 30 months, the unstabilized sample was black, with pronounced cracks in the surface; the sample stabilized with dibutyltin dilaurate showed surface crazing, was nearly black, and was covered with whitish exudate. A similar sample stabilized with 4 parts of phenylphosphondiamide was light yellow-brown in color and still retained its original shiny surface.

EXAMPLE 3

Samples were prepared according to the procedure given in Example 1, except for the amount of stabilizer. In some cases, heat stabilizers were added. The samples were exposed outdoors as in Example 2 for 17 months. The unstabilized sample was light brown after only 3 months. Table II describes the appearance of the samples after 17 months' exposure.

Table II

| Sample | Light Stabilizer | Parts by Weight | Heat Stabilizer | Parts by Weight | Appearance After 17 Months' Exposure |
|---|---|---|---|---|---|
| 1 | None | | None | | Black. |
| 2 | $((CH_3)_2N)_3P:O$ | 2.0 | Staflex OY [1] | 2.0 | Transparent, water white. |
| | | | Ferro 900 [2] | 2.0 | |
| 3 | $((CH_3)_2N)_3P:O$ | 2.5 | None | | Transparent, slightly cloudy. |
| 4 | $((CH_3)_2N)_3P:O$ | 2.0 | $Na_2CO_3$ | 2.0 | Opaque, white. |
| 5 | $ClCH_2P(O)(N(CH_3)_2)_2$ | 4.0 | None | | Do. |
| 6 | $ClCH_2P(O)(N(CH_3)_2)_2$ | 2.0 | $Na_2CO_3$ | 2.0 | Do. |
| 7 | $C_6H_5P(O)(NH_2)_2$ | 4.0 | None | | Transparent, cloudy, light tan. |

[1] Staflex OY is cadmium ricinoleate sold by the Deecy Products Co.
[2] Ferro 900 is an organic hydrochlorophil of the epoxy type sold by the Ferro Chemical Corp.

The preparation of methyl bis-(dimethylamido) phosphate and tris-(dimethylamido) phosphate is shown in U.S. Patent 2,487,859 of Dickey et al. The preparation of phenyl phosphondiamide and of N,N'-diphenyl phenyl phosphondiamide is described by Michaelis in Annalen, 293, 193 (1896), Annalen, 294, 1 (1896), and Annalen, 407, 290 (1915).

*Preparation of N,N'-tetramethyl phenylphosphondiamide.*—Phenylphosphonyl dichloride (19.5 g.) was dissolved in 250 ml. of dry ether, and the reaction flask was cooled with an acetone-solid carbon dioxide bath while gaseous dimethylamine was bubbled in with stirring. When the solution became basic, the reaction mixture was allowed to come to room temperature with stirring. The dimethylamine hydrochloride formed was removed by filtration. When the ether was evaporated from the filtrate, white crystals of product were obtained. These were recrystallized from a mixture of hexane and benzene, and were found to melt at 78–80° C. Other substituted phenylphosphondiamides can be prepared by a similar procedure, using the appropriate amine.

*Preparation of N,N'-tetramethyl chloromethylphosphondiamide.*—Chloromethylphosphonyl dichloride (16.8 g.) was dissolved in 150 ml. of dry ether and the reaction flask was cooled with an acetone-solid carbon dioxide bath while gaseous dimethylamine was bubbled in with stirring. When the solution became basic, the reaction mixture was allowed to come to room temperature with stirring. After filtering off the dimethylamine hydrochloride, the ether was evaporated. The resulting oil was vacuum distilled, yielding 15.6 g. of a water white oil whose boiling point was 110–112° C. at 2.5 mm. This oil solidified into long white needles which melted at about 35° C. The N,N'-tetraethyl, tetrapropyl, and tetrabutyl chloromethylphosphondiamides could be prepared similarly using the appropriate amine.

What we claim as our invention and desire to be secured by Letters Patent of the United States is:

1. A plastic composition comprising 100 parts by weight of polyvinyl chloride, and, as a stabilizer for inhibiting deterioration of the plastic by ultraviolet light, from 0.1 part to 10 parts by weight of a phosphorus amide having the general formula $(R)_2R'P:O$, in which R is a radical selected from the group consisting of amino, dimethyl amino, and phenylamino, and R' is a radical selected from the group consisting of dimethyl amino, methoxy, phenyl, and chloromethyl.

2. A plastic composition according to claim 1, in which the composition also contains a plasticizer for the polyvinyl chloride.

3. A plastic composition according to claim 1, in which the composition also contains a heat stabilizer for the polyvinyl chloride.

4. A plastic composition comprising 100 parts by weight of polyvinyl chloride, and, as a stabilizer of inhibiting deterioration of the plastic by ultraviolet light, from 0.1 part to 10 parts by weight of methyl bis-(dimethylamido) phosphate.

5. A plastic composition comprising 100 parts by weight of polyvinyl chloride, and, as a stabilizer for inhibiting deterioration of the plastic by ultraviolet light, from 0.1 part to 10 parts by weight of tris-(dimethylamido) phosphate.

6. A plastic composition comprising 100 parts by weight of polyvinyl chloride, and, as a stabilizer for inhibiting deterioration of the plastic by ultraviolet light, from 0.1 part to 10 parts by weight of phenyl phosphondiamide.

7. A plastic composition comprising 100 parts by weight of polyvinyl chloride, and, as a stabilizer for inhibiting deterioration of the plastic by ultraviolet light, from 0.1 part to 10 parts by weight of N,N'-tetramethyl phenyl phosphondiamide.

8. A plastic composition comprising 100 parts by weight of polyvinyl chloride, and, as a stabilizer for inhibiting deterioration of the plastic by ultraviolet light, from 0.1 part to 10 parts by weight of N,N'-tetramethyl chloromethyl phosphondiamide.

References Cited in the file of this patent

UNITED STATES PATENTS

| | | |
|---|---|---|
| 2,642,406 | Dickey et al. | June 16, 1953 |
| 2,661,347 | Wesp et al. | Dec. 1, 1953 |
| 2,719,140 | Slocombe et al. | Sept. 27, 1955 |
| 2,769,792 | Ham | Nov. 6, 1956 |